(12) United States Patent
Gartley et al.

(10) Patent No.: US 6,248,266 B1
(45) Date of Patent: Jun. 19, 2001

(54) METHOD OF MAKING LENS WITH COLORED PORTION

(75) Inventors: Michael G. Gartley, Livonia; Daniel M. Ammon, Jr., Rochester, both of NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/637,246

(22) Filed: Aug. 11, 2000

(51) Int. Cl.$^7$ ........................................ B29D 11/00
(52) U.S. Cl. ..................... 264/1.36; 264/1.7; 264/440; 425/808
(58) Field of Search ...................... 264/1.1, 1.36, 264/2.1, 1.7, 438, 439, 440; 425/810, 808, 174.8 R, 174.8 E

(56) References Cited

U.S. PATENT DOCUMENTS

| | | | |
|---|---|---|---|
| 4,071,293 | 1/1978 | Avery | 351/160 |
| 4,576,453 | 3/1986 | Borowsky | 351/162 |
| 4,582,402 | 4/1986 | Knapp | 351/162 |
| 4,601,545 | 7/1986 | Kern | 350/347 |
| 4,639,105 * | 1/1987 | Neefe | 264/2.1 |
| 4,640,805 * | 2/1987 | Neefe | 264/2.1 |
| 4,666,640 * | 5/1987 | Neefe | 264/2.1 |
| 4,707,236 | 11/1987 | Borowsky | 204/182.8 |
| 5,120,121 | 6/1992 | Rawlings et al. | 351/162 |
| 5,260,000 | 11/1993 | Nandu et al. | 264/2.1 |
| 5,414,477 | 5/1995 | Jahnke | 351/162 |
| 5,712,721 | 1/1998 | Large | 359/245 |

* cited by examiner

Primary Examiner—Mathieu D. Vargot
(74) Attorney, Agent, or Firm—John E. Thomas

(57) ABSTRACT

A method of making a lens, such as a contact lens, with a colored portion involves introducing a lens-forming monomer mixture and an ionic colored material to a lens mold, applying an electrical field to the monomer mixture and the colored material, whereby the colored material migrates in response to the electrical field to form a desired pattern, and curing the lens-forming monomer mixture with the colored material forming a desired colored pattern in the lens.

14 Claims, 2 Drawing Sheets

METHOD OF MAKING LENS WITH COLORED PORTION

FIELD OF THE INVENTION

This invention relates a method of making lenses, especially contact lenses, having a colored or tinted portion.

BACKGROUND OF THE INVENTION

Various colored contact lenses are known in the art. One class of colored lenses includes "cosmetic" lenses useful for enhancing or changing the apparent color of the wearer's iris. Generally, these lenses include a colored iris section, and the colored contact lenses may include an optical correction, for example to accommodate farsightedness or nearsightedness of the wearer of the contact lens, or the contact lenses may be provided with the colored iris section solely for cosmetic purposes. Examples of such contact lenses are disclosed in U..S Pat. Nos. 5,120,121 and 4,582,402. The colored contact lenses of U.S. Pat. No. 4,582,402 are produced by printing a colored, opaque, intermittent pattern over the iris section of a contact lens. The colored contact lenses of U.S. Pat. No. 5,120,121 are produced by applying a pattern comprised of lens forming mixture doped with a tint to a mold surface, subjecting the mold to polymerization conditions so as to partially or fully polymerize the pattern on the mold surface, dispensing a conventional lens forming monomer mixture which does not contain ink into the mold such that it submerges the previously polymerized pattern, and polymerizing this mixture to obtain a contact lens.

In addition to the cosmetic contact lenses, U.S. Pat. Nos. 4,576,453 and 4,707,236 disclose a contact lens for light sensitive lens wearers having a progressively optically graded area therein. In U.S. Pat. No. 4,707,236, such lenses are made by bringing an ionized dye into contact with the lens gel material at a central point, and applying an electric potential across the lens gel, thus causing the dye to migrate towards the periphery, and whereby the higher concentration of dye is at the central point with the concentration progressively diminishing towards the periphery.

SUMMARY OF THE INVENTION

This invention provides a method of making a lens, such as a contact lens, with a colored portion. The method comprises: introducing a lens-forming monomer mixture and an ionic colored material to a lens mold; applying an electrical field to the monomer mixture and the colored material, whereby the colored material migrates in response to the electrical field to form a desired pattern; and curing the lens-forming monomer mixture with the colored material forming a desired colored pattern in the lens.

A positive electrode may be formed on one of a first and second mold portion, with a negative electrode being formed on the other mold portion. The positive and negative electrodes may be arranged such that the colored material migrates to form an annular ring, for example, an annular ring corresponding to an iris portion of a contact lens. Alternately, electrical probes may be brought into contact with the lens mold. Representative colored materials include materials comprising pigment particles or dyes.

DETAILED DESCRIPTION OF VARIOUS PREFERRED EMBODIMENTS

Figure 1:
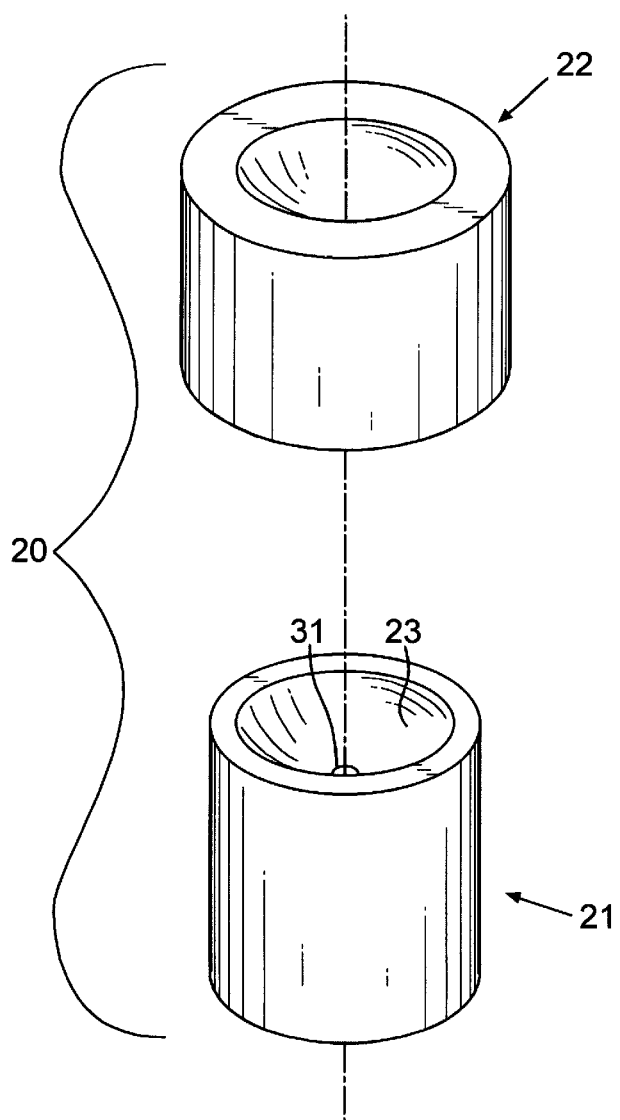
FIG. 1 is an exploded, perspective view of a contact lens mold assembly according to a first embodiment.
Figure 4:
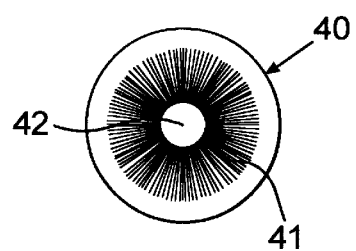
FIG. 4 is a plan view of a contact lens of this invention according to various embodiments.
Figure 2:
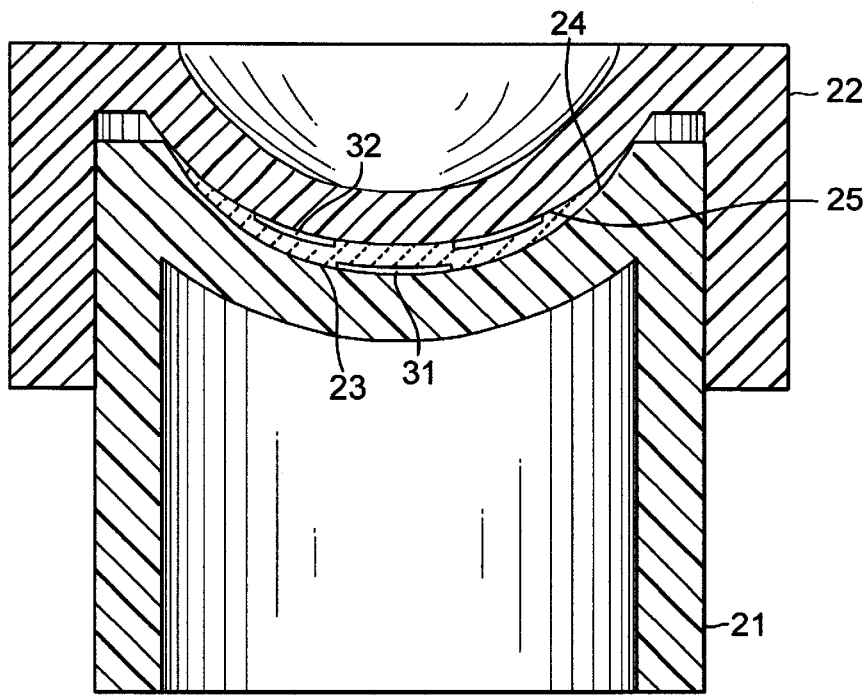
FIG. 2 is a cross-sectional view of the mold assembly of FIG. 1.

FIGS. 1 and 2 illustrate a first embodiment of an apparatus for practicing this invention. The lens mold assembly 20 comprises a first, anterior mold section 21 including an anterior molding surface 23, and a second, posterior mold section 22 including a posterior molding surface 24. In the illustrated embodiment, the anterior molding surface 23 includes a centrally located cathode 31, and the posterior molding surface 24 includes an annularly arranged anode 32. In this illustrated embodiment, the cathode 31 and anode 32 may have the form of a film of electrically conductive material, such as a metal foil or film, for example, copper film.

According to conventional lens casting procedures, a lens-forming monomer mixture is introduced to the anterior mold section 21, i.e., the monomer mixture is deposited on the anterior molding surface 23. Then, the mold sections 21, 22 are brought together, to assume the general configuration shown in FIG. 2, so that a lens-shaped molding cavity 25 is defined between the anterior and posterior molding surfaces 23, 24.

According to the illustrated embodiment of this invention, an ionized, or charged, colored material is also introduced to the mold assembly, prior to fully assembling the mold sections. The colored material is either in admixture with the lens-forming monomer mixture, or the colored material may be introduced to the mold section before or after the lens-forming monomer mixture is deposited therein. Then, the mold sections are brought together and assembled.

An electrical field is applied to the lens-forming monomer mixture and colored material through the cathode 31 and anode 32. In response to this electrical field, the colored material will migrate to form a pattern defined by the electrodes. For example, in the case where the colored material is positively charged, it will migrate towards the anode 32 and away from the cathode 31.

The lens-forming monomer mixture is cured while the colored material is maintained in the desired pattern. Curing may be accomplished by conventional free radical polymerization processes. Generally, such processes involve the application of heat, light, or both for a sufficient time to cure the monomer mixture. In the case where photopolymerization is used to cure the monomer mixture, the cathode and electrode should not be too thick, or not arranged to block too much surface of the molds, so that sufficient light reaches the monomer mixture to effect curing. Then, the mold sections 21, 22 are separated and the contact lens cured in cavity 25 is recovered. Accordingly, for the illustrated embodiment, a contact lens 40 is obtained, where the colored material forms an annular pattern 41, for example, an annular ring generally corresponding to the iris portion of the contact lens 40. The uncolored central section 42 may generally correspond to the pupil region of the contact lens.

The lens-forming monomer mixtures employed in the invention include conventional lens-forming monomers. Preferably, the lens-forming monomers are monomers that are polymerizable by free radical polymerization, generally including an activated unsaturated radical, and most preferably an ethylenically unsaturated radical. (As used herein, the term "monomer" denotes relatively low molecular weight compounds that are polymerizable by free radical polymerization, as well as higher molecular weight compounds that are polymerizable by free radical polymerization and also referred to as "prepolymers", "macromonomers", and related terms.) Generally, the lens-forming monomer mixture will be liquid when added to the mold assembly. Also, the lens-forming monomer mixture will generally be clear and colorless, although it is possible for the monomer mixture to include a minor amount of tint.

An especially preferred class of materials are hydrogel copolymers. A hydrogel is a crosslinked polymeric system that can absorb and retain water in an equilibrium state. Accordingly, for hydrogels, the lens-forming monomer mixture will typically include at least one hydrophilic monomer and a crosslinking agent (a crosslinker being defined as a monomer having multiple polymerizable functionalities).

Suitable hydrophilic monomers include: unsaturated carboxylic acids, such as methacrylic acid and acrylic acid; (meth)acrylic substituted alcohols, such as 2-hydroxyethylmethacrylate and 2-hydroxyethylacrylate; vinyl lactams, such as N-vinyl pyrrolidone; and (meth) acrylamides, such as methacrylamide and N,N-dimethylacrylamide. Typical crosslinking agents include polyvinyl, typically di- or tri-vinyl monomers, such as di- or tri(meth)acrylates of diethyleneglycol, triethyleneglycol, butyleneglycol and hexane-1,6-diol; and divinylbenzene. A specific example of a hydrogel-forming monomer mixture is polymacon, composed primarily of 2-hydroxyethylmethacrylate with a small amount of diethyleneglycol methacrylate as a crosslinking monomer. Optionally, the monomer mixture may include a silicone-containing monomer in order to form a silicone hydrogel copolymer. Examples of silicone-containing monomers include: monomers including a single activated unsaturated radical, such as methacryloxypropyl tris(trimethylsiloxy) silane, pentamethyldisiloxanyl methylmethacrylate, tris (trimethylsiloxy) methacryloxy propylsilane, methyldi (trimethylsiloxy) methacryloxymethyl silane, 3-[tris (trimethylsiloxy)silyl] propyl vinyl carbamate, and 3-[tris (trimethylsiloxy)silyl] propyl vinyl carbonate; and multifunctional ethylenically "end-capped" siloxane-containing monomers, especially difunctional monomers having two activated unsaturated radicals. A specific example of a silicone hydrogel-forming monomer mixture is balafilcon, based on N-vinyl pyrrolidone and the aforementioned vinyl carbonate and carbamate monomers, disclosed in U.S. Pat. No. 5,260,00. Many other lens-forming monomers and specific mixtures thereof are well-known in the art.

As mentioned, the colored material may be mixed with the lens-forming monomers prior to introducing this mixture to the mold, or the colored material may be added to the mold section before or after the lens-forming monomer mixture is added. Additionally, the colored material is ionic, or charged, so that it migrates in response to the applied electrical field. Representative charged colored materials include pigments, having the form of solid particles, and dyes. The pigment or dye may be premixed with the lens-forming monomers for simultaneous introduction to the mold. Alternately, the pigment or dye may introduced separately to the mold, and if desired, an inert liquid diluent may be mixed with the pigment or dye. The amount of the colored material included with the monomer mixture will depend on the color intensity of the colored material, as well as the desired color intensity of the formed pattern in the lens. Generally, however, the colored material may be included at 0.1 to 20 weight percent, preferably 0.2 to 10 weight percent, of the total monomer mixture.

Specific examples of positively charged pigments include: ultramarine blue, FD&C blue no. 1, and chromium hydroxide green (available from BF Goodrich, Cleveland, Ohio, USA). Specific examples of positively charged dyes (including CI designations) include: ingrain blue 1 (CI 72420), basic green 1 (CI 42040), basic red 9 (CI 42500) and basic blue 9 (CI 52015) (available from Aldrich, Milwaukee, Wis., USA). Specific examples of negatively charged dyes (including CI designations) include: acid red 151 (CI 26900), acid blue 120 (CI 26400), acid orange 8 (CI 15575) and acid green 27 (CI 61580) (available from Aldrich).

Figure 3:
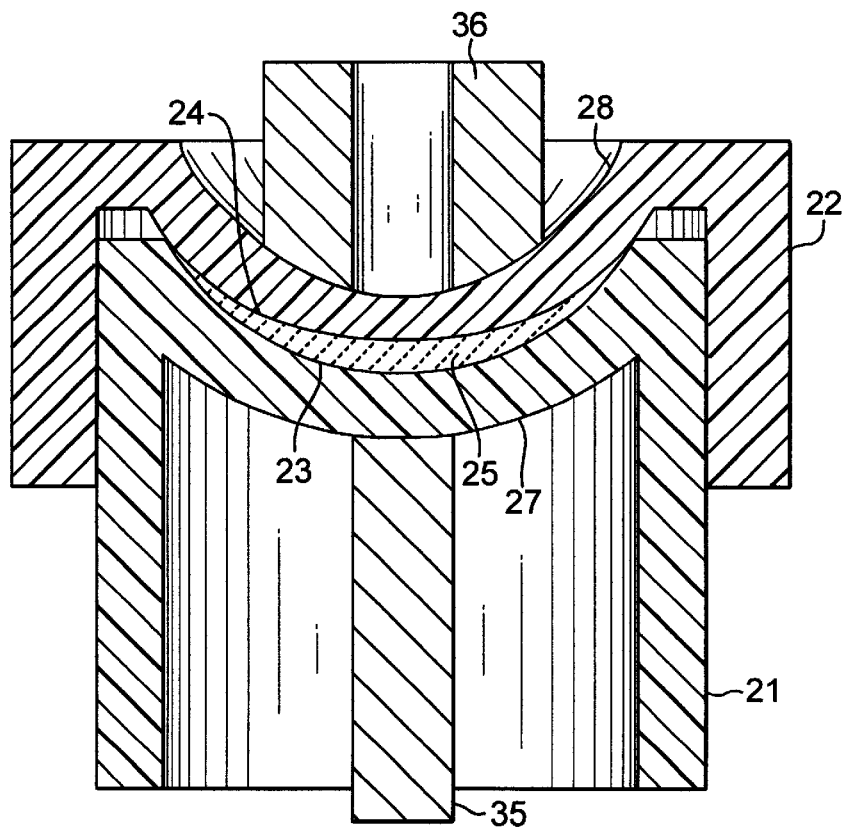
FIG. 3 is a cross-sectional view of a mold assembly according to a second embodiment.

FIG. 3 illustrates an alternate embodiment of an apparatus for practicing this invention. In the lens mold assembly 20, a positively charged probe 35 is brought into contact with the surface 27 of mold section 21 that is opposed to molding surface 23, and a negatively charged probe 36 is brought into contact with the surface 28 of mold section 22 that is opposed to molding surface 24. As in the previously described first embodiment, after depositing a mixture of the lens-forming monomers and colored material to the molds, and assembling the mold sections to assume the general configuration shown in FIG. 3, an electrical field is applied through the cathode probe 35 and anode probe 36. In response to this electrical field, the colored material will migrate to form a pattern defined by the electrodes. For example, in the case where the colored material is positively charged, it will migrate towards the anode probe 36 and away from the cathode 35. The lens-forming monomer mixture is cured while the colored material is maintained in the desired pattern, then the mold sections 21, 22 are separated and the contact lens cured in cavity 25 is recovered. For this illustrated embodiment, contact lens 40 is obtained, where the colored material forms an annular pattern 41.

Of course, when a negatively charged colored material is used in place of a positively charged colored material, the colored will migrate towards the cathode instead of the anode. It will be appreciated that various patterns of colored regions may be formed by the method of this invention. For example, patterns having a shape other than a colored annular region may be formed, by varying the specific arrangement of the cathodes and anodes.

As another embodiment of this invention, the mold cavity 25 does not have to assume the shape of a finished contact lens. For example, the mold cavity may have the shape of a cylinder, whereby a cylindrical blank of cured lens material is formed therein, and this resultant cylindrical blank includes a desired colored pattern. Then, this blank may be lathe cut to form a finished contact lens.

Many other modifications and variations of the present invention will be evident to the skilled practitioner in the field in view of the teachings herein. It is therefore understood that, within the scope of the claims, the present invention can be practiced other than as specifically described.

We claim:

1. A method of making a lens with a colored portion, comprising:

introducing a lens-forming monomer mixture and an ionic colored material to a lens mold;

applying an electrical field to the monomer mixture and the colored material, whereby the colored material migrates in response to the electrical field to form a desired pattern; and curing the lens-forming monomer mixture with the colored material forming a desired colored pattern in the lens.

2. The method of claim 1, wherein the lens mold comprises a first mold section including an anterior molding surface and a second mold section including a posterior molding surface, and the lens-forming monomer mixture and the colored material are charged to a molding cavity formed between the anterior and posterior molding surfaces.

3. The method of claim 2, wherein a positive electrode is formed on one of the first and second mold portions, and a negative electrode is formed on the other of the first and second mold portions.

4. The method of claim 2, wherein electrical probes are brought into contact with the first and second mold sections.

5. The method of claim 3, wherein the positive and negative electrodes are arranged such that the colored material migrates to form an annular ring.

6. The method of claim 5, wherein the annular ring corresponds to an iris portion of a contact lens.

7. The method of claim 1, wherein the lens is a hydrogel contact lens and the lens-forming monomer mixture includes a hydrophilic monomer.

8. The method of claim 7, wherein the lens-forming monomer mixture is cured by application of light energy, heat or both.

9. The method of claim 1, wherein the lens-forming monomer mixture and the colored material are charged simultaneously to the lens mold.

10. The method of claim 1, wherein the colored material is first charged to the lens mold, followed by charging the lens-forming monomer mixture to the mold.

11. The method of claim 1, wherein the colored material comprises pigment particles.

12. The method of claim 1, wherein the colored material comprises a dye.

13. The method of claim 1, wherein the desired pattern is an annular ring.

14. The method of claim 13, wherein the annular ring corresponds to an iris portion of a contact lens.

* * * * *